United States Patent Office 2,879,220
Patented Mar. 24, 1959

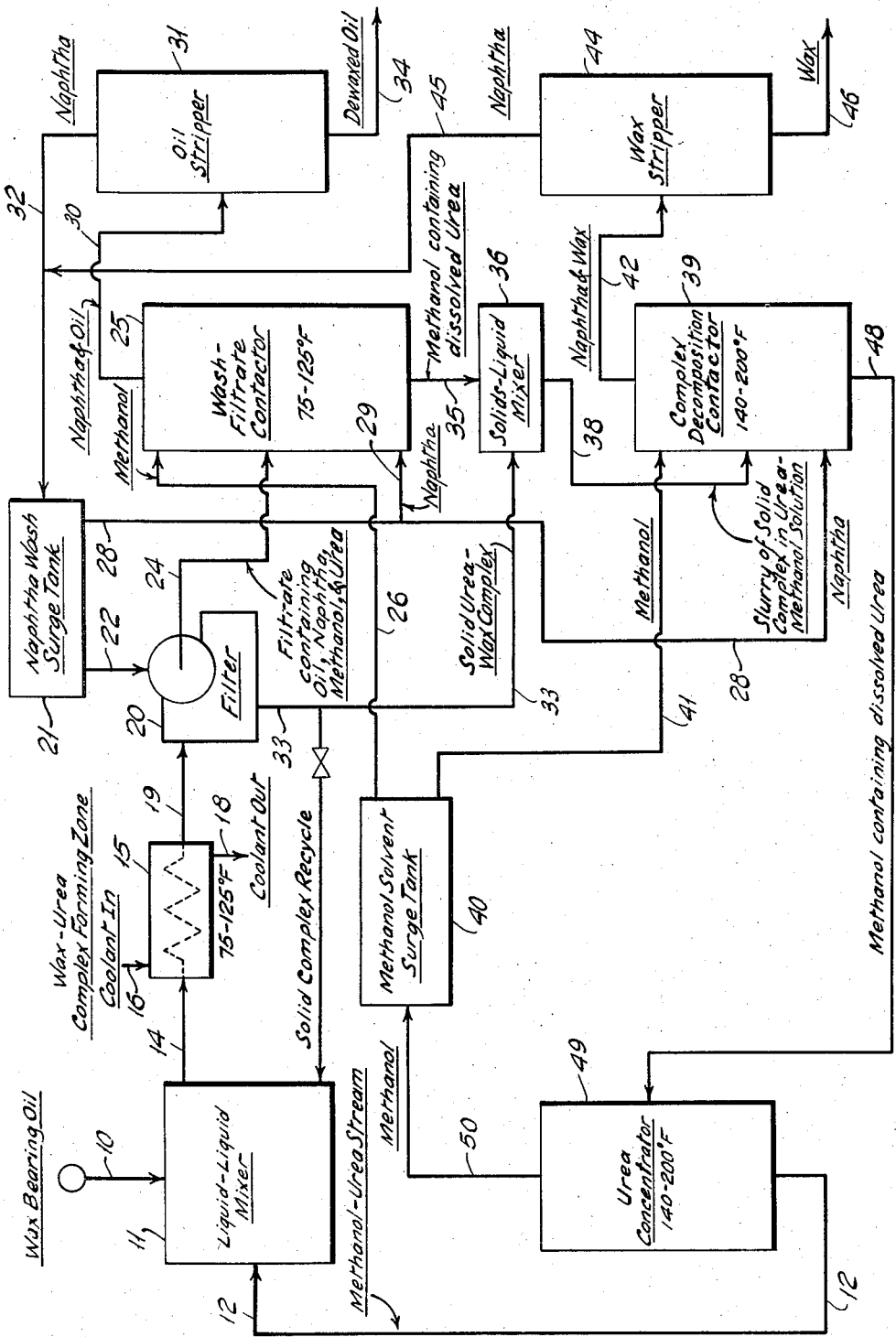

2,879,220

METHOD OF SEPARATING MIXTURES OF ORGANIC COMPOUNDS

George B. Arnold, Fishkill, N.Y., and Louis Kovach, Oak Ridge, Tenn., assignors to The Texas Company, New York, N.Y., a corporation of Delaware Application July 14, 1955, Serial No. 522,114

15 Claims. (Cl. 208—25)

This invention relates to a method for the fractionation of mixtures of organic compounds. More particularly, this invention relates to a method for the fractionation of mixtures of organic compounds by extractive crystallization with urea or thiourea or their analogs.

Extractive crystallization with urea or thiourea effects a separation of mixtures of organic compounds on the basis of the shape or molecular configuration of the compounds making up the mixture. Extractive crystallization employing urea as the complex-forming agent has been proposed or suggested for the separation of straight chain hydrocarbons from various petroleum fractions containing the same, e.g. gasolines or heavy distillate fractions, in order to improve octane rating. Urea extractive crystallization has been proposed to reduce the pour point of jet fuels and to eliminate haze from lubricating oils. Urea extractive crystallization has also been proposed to effect the separation and purification of n-paraffins in the molecular weight range $C_7$-$C_{24}$ and higher up to about $C_{50}$. Further, urea extractive crystallization has been proposed to separate alpha-olefins from thermally cracked wax or from gasoline or gas oil stocks, to remove waxy paraffins possessing small side chain branches from wax or lube oil distillates, to fractionate mixtures of fatty acids, esters and amides. In the application of urea extractive crystallization to the fractionation of fatty acid mixtures it has been found that urea effects a separation of straight chain fatty acids from branched chain fatty acids. Accordingly urea extractive crystallization has been proposed for the separation of pure ricinoleic, linoleic and oleic oils and acids from mixtures containing the same.

Thiourea extractive crystallization has been proposed for the separation of certain highly branched components fom aviation alkylates. Thiourea extractive crystallization distinguishes from urea extractive crystallization in that urea forms complexes or adducts with substantially straight chain aliphatic organic compounds, particularly the n-paraffins and n-olefins, or compounds which are substantially or predominantly straight chain compounds whereas thiourea forms complexes or adducts with certain of the branched chain and naphthenic type hydrocarbons, such as the isoparaffins and isoolefins, cyclohexane, methylcyclohexane and the like.

By way of explanation of the nature and characteristics of urea and thiourea complexes, it has been proposed that the urea molecules in a urea-n-paraffin hydrocarbon complex form a channel large enough to accommodate the planar zig-zag configuration of the long chain hydrocarbon molecules. Van der Wall's forces contribute to the stability of the complex as do the hydrogen bonds between the hydrogen of the $NH_2$ group and the oxygen of the adjacent urea molecule. Generally, the stability of the urea and thiourea complexes increases with increasing molecular weight of the compound making up the complex with urea. For example, the urea-n-$C_7$ paraffin complex is more readily dissociated and less stable than the urea-n-$C_{17}$ paraffin complexes. Complexes are readily dissociated with the application of heat, particularly in the presence of a solvent for one of the components making up the complex, either urea or the complex-forming compound. However the maximum temperature at which a complex can exist is determined by the melting point of the complex forming agent, urea or thiourea.

In accordance with the practice of this invention a mixture of organic compounds, such as a mixture of fatty acids to be fractionated or a petroleum fraction to be dewaxed, is contacted with urea or thiourea to form the corresponding solid urea or thiourea complex. The resulting solid complex is separated from the thus-treated mixture and contacted in a complex decomposition zone with a carrier liquid which is a solvent for the complex-forming agent, urea or thiourea, and with a liquid solvent for the complex-forming compound, e.g. n-paraffins or straight chain fatty acids in the case of urea or isoparaffins and naphthenic compounds in the case of thiourea, said carrier liquid and said liquid solvent being at least partially immiscible with respect to each other during the conditions of contacting and complex decomposition. By employing a relatively elevated temperature within the contacting-decomposing zone the urea or thiourea complex is broken and there is recovered from one end of the contacting zone a liquid solvent stream containing the separated complex-forming compound dissolved therein and from the other end of the contacting-decomposing zone a carrier liquid stream containing the complex-forming agent, urea or thiourea, dissolved therein. The carrier liquid stream after subsequent treatment for the removal of a portion of the carrier liquid therefrom is recycled to contact additional feed mixture and the liquid solvent stream is subsequently separately treated for the separation and recovery of the complex-forming compound therefrom.

Complex formation is desirably carried out at about room temperature, preferably above the melting point of each of the components making up the mixture to be fractionated, such as a temperature in the range of 40–125° F. Decomposition of the resulting complex is carried out at a relatively elevated temperature, such as a temperature in the range of 125–225° F., more or less, depending upon the stability of the complex to be decomposed. As indicated hereinbefore the thermal stability of a urea or thiourea complex is determined for the most part by the molecular weight of the compound which forms the complex therewith. It is mentioned that the complex-forming temperature and the complex decomposition temperature are adjusted relative to each other depending upon the compounds which are to be separated and which are present in the mixtures undergoing treatment.

Liquid solvents which are suitable for the practice of this invention and which are solvents for those compounds which form a complex with urea or thiourea include the various normally liquid petroleum hydrocarbons or petroleum fractions in the naphtha boiling range, such as petroleum hydrocarbons having a boiling point or boiling range in the range 125–425° F., more or less, benzene, toluene, the xylenes, the various alkylated aromatic hydrocarbons, the various low molecular weight paraffins such as the butanes, pentanes, hexanes and heptanes and the like. Desirably the liquid solvent has a boiling point at atmospheric pressure greater than the temperature at which complex decomposition is effected. Furthermore, the liquid solvent should be substantially devoid of those compounds or hydrocarbons which form a complex with urea or thiourea under the conditions of complex formation or complex decomposition.

Carrier liquids which may be employed in the practice of this invention include the normally liquid polar aliphatic organic compounds, e.g. the alkanols, such as methanol, ethanol, propanol, isopropanol, isobutanol, n- butanol, tertiary butyl alcohol; the various ketones, such as acetone, methyl ethyl ketone, ethyl propyl ketone, methyl propyl ketone, methyl n-butyl ketone, methyl isobutyl ketone, aqueous solutions of the foregoing, and water. In general, any normally liquid polar aliphatic organic compounds containing from 1 to 6 carbon atoms per molecule can suitably be employed as the carrier liquid in a process in accordance with our invention. Other liquid compounds which may suitably be employed include the low boiling amines, such as ethyl amine; the low boiling mercaptans such as ethyl mercaptan; the olefin glycols such as monoethylene glycol, the alkanolamines such as ethanolamine, or mixtures thereof such as aqueous solutions of methanol and monoethylene glycol. Generally any normally liquid material which is substantially immiscible or at least partially immiscible with the liquid solvent employed in conjunction therewith and which is substantially immiscible or evidences little solubility with respect to the organic mixture undergoing fractionation and which, furthermore, evidences an increase in solubility with respect to urea and thiourea with an increase in temperature may satisfactorily be employed in the practice of our invention.

In order to describe the invention in greater detail reference is now made to the accompanying drawing which schematically illustrates one embodiment of a process employing the practice of our invention. The drawing is described herein with reference to the separation of wax from a wax-bearing mineral oil, for example a relatively low viscosity distillate lubricating oil having a pour point of about +23° F., a Saybolt Universal viscosity of about 180 seconds at 100° F. and containing about 5% by volume wax. The practice of this invention with reference to the accompanying drawing is also described with respect to the use of urea as the complex-forming agent.

Wax-bearing mineral oil obtained from a source not shown is introduced through conduit 10 into a liquid-liquid mixing or contacting zone 11 wherein it is intimately mixed and contacted with a methanol-urea stream such as a slurry of solid urea in methanol which is introduced via conduit 12 into contacting zone 11. The resulting admixture of wax-bearing oil and methanol-urea slurry is passed via conduit 14 into a cooled, complex-formation zone 15 which is maintained at a temperature sufficient to effect the formation of wax-urea complex, such as a temperature in the range 75–125° F., more or less, depending upon the composition of the oil undergoing fractionation and the amount of wax to be removed. The complex-formation zone is provided with a coolant inlet 16 and a coolant outlet 18 through which a suitable coolant, such as water, serves by indirect heat exchange to maintain the complex-formation zone at the temperature most suitable for complex formation. The resulting admixture issuing from complex formation zone 15, now containing solid wax-urea complex and a liquid mixture of treated oil and methanol containing urea dissolved therein is introduced via line 19 into a wax-urea complex separation zone such as a rotary filter 20 wherein a separation between the solid wax-urea complex and the remaining liquid mixture is effected. The solid wax-urea complex is washed by suitable liquid solvent, such as benzene, toluene, naphtha or a suitable branched chain hydrocarbon applied to rotary filter 20 from naphtha wash surge tank 21 via conduit 22.

The resulting liquid admixture now containing the wash naphtha together with the treated oil and methanol containing urea dissolved therein is introduced via conduit 24 at about the central section of a liquid-liquid wash-filtrate contacting zone 25 where it is contacted with countercurrently flowing streams of methanol introduced via conduit 26 into the upper end of contacting zone 25 and liquid naphtha supplied from naphtha wash surge tank 21 and conduits 28 and 29 into the lower end of contacting zone 25. The methanol and naphtha (which desirably has substantially the same composition as the wash naphtha) introduced into contacting zone 25 are substantially immiscible under the conditions of contacting and there issues from the upper end of contacting zone 25 (which is suitably maintained at a temperature in the range 75–150° F., preferably the same temperature as the temperature employed in the complex-forming zone) a liquid naphtha stream containing treated substantially wax-free oil dissolved therein. This naphtha stream is introduced via conduit 30 into oil stripper 31 wherein the naphtha is distilled therefrom and returned to naphtha wash surge tank 21 via conduit 32. The resulting substantially naphtha-free dewaxed oil is recovered from the bottom of stripper 31 via conduit 34. From the lower end of contacting zone 25 there issues via conduit 35 a liquid methanol stream containing urea dissolved therein.

The solid wax-urea complex is removed from filter 20 and introduced via conduit 33 into solids-liquid mixing zone 36 wherein it is admixed with the aforementioned methanol stream introduced into mixing zone 36 via conduit 35. The resulting solids-liquid admixture, a slurry of solid wax-urea complex in a urea-methanol solution, is supplied from mixing zone 36 via conduit 38 into complex decomposition zone 39 which is maintained at a suitable elevated temperature sufficient to effect decomposition of the wax-urea complex, such as a temperature in the range 140–200° F., more or less. There is introduced into the upper end of complex decomposition zone 39 a liquid methanol stream supplied from methanol solvent surge tank 40 via conduit 41 and there is introduced into the lower end of complex decomposition zone 39 a liquid naphtha stream supplied from naphtha wash surge tank 21 via conduit 28.

Complex decomposition zone 39 is operated under such conditions of temperature that the solid wax-urea complex introduced thereinto is decomposed in the presence of the countercurrently flowing immiscible streams of naphtha and methanol. There is recovered from the upper end of complex decomposition zone 39 a liquid naphtha stream containing dissolved wax. This liquid naphtha stream is introduced via conduit 42 into wax stripper 44 wherein the naphtha is separated by distillation and returned to naphtha wash surge tank 21 via conduits 45 and 32. Wax is recovered from the bottom of wax stripper 44 via conduit 46.

There is recovered from the lower end of complex decomposition zone 39 a liquid methanol stream containing dissolved urea. This liquid methanol stream is introduced via conduit 48 into urea concentrator 49 which is maintained at a suitable elevated temperature, such as substantially the same as the temperature employed in complex decomposition zone 39 or higher. A portion of the methanol is separated by distillation within urea concentrator 49 and is recovered via conduit 50 in methanol solvent surge tank 40 for subsequent use in the process. A saturated, supersaturated solution or desirably a slurry of solid urea in liquid methanol is recovered from the urea concentrator 49 via conduit 12 and after cooling, if desired, is introduced into liquid-liquid mixer 11 wherein it contacts additional wax-bearing oil for the formation of additional solid wax-urea complex. Desirably, as indicated in the accompanying drawing, a portion of the solid wax-urea complex recovered from filter 20 is returned to the liquid-liquid mixer 11 to aid in the formation of the wax-urea complex within complex-formation zone 15.

By operating in the above-described manner in accordance with this invention a substantially continuous separation of wax from a wax-bearing oil is carried out.

While urea and thiourea have been specifically mentioned as being suitable in the practice of this invention it is contemplated that alkyl-substituted derivatives thereof, such as butyl urea and the like, may also be satisfactorily employed in the practice of this invention as well as other derivatives.

Obviously many modifications and variations of this invention as hereinbefore set forth may be made in the light of this disclosure without departing from the spirit or scope of this invention.

We claim:

1. A method for fractionating a liquid mixture of organic compounds containing components which form a solid complex with a complex-forming agent selected from the group consisting of urea and thiourea which comprises contacting said liquid mixture with said complex-forming agent in a carrier liquid which is a solvent for said complex-forming agent and which is immiscible with said liquid mixture to form said solid complex comprising said complex-forming components and said complex-forming agent, separating said solid complex, recovering a remaining liquid comprising the resulting treated liquid mixture and said carrier liquid containing dissolved therein said complex-forming agent, washing said separated complex with a liquid solvent immiscible with said carrier liquid to recover additional remaining liquid therefrom, combining the resulting wash liquid with said remaining liquid, introducing the combined liquids into a first contacting zone in direct contact with additional liquid solvent and additional carrier liquid introduced into said contacting zone at opposite ends thereof, withdrawing from one end of said first contacting zone a liquid solvent stream containing the resulting treated liquid mixture dissolved therein, withdrawing from the other end of said first contacting zone a first carrier liquid phase containing said complex-forming agent dissolved therein, forming a slurry of said washed separated complex with said first carrier liquid phase, introducing said slurry into a second contacting zone in direct contact with additional liquid solvent and additional carrier liquid introduced at opposite ends of said second contacting zone, decomposing said complex within said second contacting zone, withdrawing from one end of said second contacting zone a liquid solvent stream containing said complex-forming components dissolved therein and withdrawing from the other end of said second contacting zone a second carrier liquid phase containing dissolved complex-forming agent.

2. A process for fractionating a liquid hydrocarbon mixture containing components which form a solid complex with a complex-forming agent selected from the group consisting of urea and thiourea which comprises contacting said liquid hydrocarbon mixture with said complex-forming agent in a carrier liquid which is a solvent for said complex-forming agent and which is immiscible with said hydrocarbon mixture to form said solid complex comprising said complex-forming components and said complex-forming agent, separating said solid complex, recovering a remaining liquid comprising the resulting treated liquid hydrocarbon mixture and said carrier liquid containing dissolved therein said complex-forming agent, washing said separated solid complex with a liquid, low boiling petroleum fraction immiscible with said carrier liquid to recover additional remaining liquid therefrom, combining the resulting wash liquid with said remaining liquid, introducing the combined liquids into a first contacting zone in direct contact with additional liquid petroleum fraction and additional carrier liquid introduced at opposite ends of said first contacting zone, withdrawing from one end of said first contacting zone a liquid petroleum fraction stream containing said treated hydrocarbon mixture dissolved therein, withdrawing from the other end of said first contacting zone a first carrier liquid phase containing said solid complex-forming agent dissolved therein, forming a slurry of said washed separated solid complex with said first carrier liquid phase, introducing said slurry into a second contacting zone into direct contact with additional liquid petroleum fraction and additional carrier liquid, decomposing said complex within said second contacting zone, withdrawing from one end of said second contacting zone a liquid petroleum fraction stream containing complex-forming compounds dissolved therein and withdrawing from the other end of said second contacting zone a second carrier liquid phase containing dissolved complex-forming agent.

3. A process for fractionating a liquid hydrocarbon mixture containing components which form a solid complex with a complex-forming agent selected from the group consisting of urea and thiourea which comprises contacting said liquid hydrocarbon mixture with a first slurry of said complex-forming agent in a carrier liquid which is a solvent for said complex-forming agent and which is at least partially immiscible with said liquid hydrocarbon mixture under the conditions of contacting to form said solid complex comprising said complex-forming components and said complex-forming agent, separating said solid complex, recovering a remaining liquid comprising the resulting treated liquid hydrocarbon mixture and said carrier liquid containing dissolved therein said complex-forming agent, washing said separated complex with a liquid low boiling petroleum fraction which is immiscible with said carrier liquid to recover additional remaining liquid therefrom, combining the resulting wash liquid with said remaining liquid in a first contacting zone in direct contact with additional liquid petroleum fraction and additional carrier liquid, withdrawing from one end of said first contacting zone a liquid petroleum fraction stream containing said treated hydrocarbon mixture dissolved therein, withdrawing from the other end of said first contacting zone a first carrier liquid phase containing said complex-forming agent dissolved therein, forming a second slurry of said washed separated solid complex with said carrier liquid phase withdrawn from the other end of said first contacting zone, introducing said second slurry into a second contacting zone in direct contact with additional liquid petroleum fraction and additional carrier liquid, decomposing said complex within said second contacting zone, withdrawing from one end of said second contacting zone a liquid petroleum fraction stream containing said complex-forming components dissolved therein and withdrawing from the other end of said second contacting zone a second carrier liquid phase containing dissolved complex-forming agent.

4. A method of fractionating a liquid hydrocarbon mixture containing components which form a solid complex with a complex-forming agent selected from the group consisting of urea and thiourea which comprises contacting said liquid hydrocarbon mixture under complex-forming conditions with a first slurry comprising solid complex-forming agent admixed in a carrier liquid which is a solvent for said complex-forming agent and which is at least partially immiscible with said liquid hydrocarbon mixture under the conditions of contacting to form said solid complex comprising said complex-forming components and said complex-forming agent, separating said solid complex, recovering a remaining liquid comprising the resulting treated liquid hydrocarbon mixture and said carrier liquid containing dissolved therein said complex-forming, agent, washing said separated complex with a liquid low boiling petroleum fraction which is a solvent for said complex-forming components and which is immiscible with said carrier liquid so as to recover additional remaining liquid from said separated solid complex, combining the resulting wash liquid and said remaining liquid within a first contacting zone in direct contact with additional liquid petroleum fraction and additional carrier liquid, withdrawing from one end of said first contacting zone a liquid petroleum fraction stream containing said treated hydrocarbon mixture dissolved therein, withdrawing from the other end of said first contacting zone a first carrier liquid phase containing said complex-forming agent dissolved therein, forming a second slurry comprising said washed separated solid complex and said first carrier liquid phase, introducing said second slurry into said second contacting zone in direct contact with additional liquid petroleum fraction and additional carrier liquid, decomposing said complex within said second contacting zone, withdrawing from one end of said second contacting zone a liquid petroleum fraction stream comprising said complex-forming components dissolved therein, withdrawing from the other end of said second contacting zone a second carrier liquid phase containing dissolved complex-forming agent and removing a portion of the carrier liquid contained in said second carrier liquid phase to produce said first slurry.

5. A process for fractionating a liquid hydrocarbon mixture containing components which form a solid complex with a complex-forming agent selected from the group consisting of urea and thiourea which comprises contacting said liquid hydrocarbon mixture with said solid complex-forming agent admixed as a slurry in a carrier liquid which is a solvent for said complex-forming agent and immiscible with said hydrocarbon mixture under complex-forming conditions to form said solid complex comprising said complex-forming components and said complex-forming agent, separating said solid complex, recovering a remaining liquid comprising the resulting treated hydrocarbon mixture and said carrier liquid containing dissolved therein said complex-forming agent, introducing said remaining liquid into a first contacting zone into direct contact with additional carrier liquid and a relatively low boiling liquid petroleum fraction which is a solvent for said treated hydrocarbon mixture and which is immiscible with said carrier liquid, withdrawing from one end of said first contacting zone a liquid petroleum fraction stream containing said treated hydrocarbon mixture dissolved therein, withdrawing from the other end of said first contacting zone a first carrier liquid stream containing said complex-forming agent dissolved therein, forming a slurry of said separated solid complex with said first carrier liquid phase, introducing said slurry into a second contacting zone in direct contact with additional liquid petroleum fraction and additional carrier liquid, decomposing said complex within said second contacting zone, withdrawing from one end of said second contacting zone a liquid petroleum fraction stream containing complex-forming components dissolved therein, and withdrawing from the other end of said second contacting zone a second carrier liquid phase containing dissolved omplex-forming agent.

6. In a process for the fractionation of a mixture of organic compounds containing components which form a solid complex with a complex-forming agent selected from the group consisting of urea and thiourea wherein said mixture is contacted under complex-forming conditions with said complex-forming agent to form a solid complex which is subsequently separated and treated for the recovery of said complex-forming components therefrom the improvement which comprises introducing said separated solid complex into a treating zone in direct contact with a liquid solvent for said complex-forming component and a carrier liquid for said complex-forming agent, said carrier liquid being a solvent for said complex-forming agent and immiscible with said liquid solvent, said liquid solvent and said carrier liquid flowing countercurrently with respect to each other within said treating zone, decomposing said complex within said treating zone, withdrawing from one end of said treating zone a liquid solvent stream containing said complex-forming component dissolved therein and withdrawing from the other end of said treating zone a carrier liquid stream containing said complex-forming agent dissolved therein.

7. A method for dewaxing a wax-containing hydrocarbon mixture which comprises contacting said mixture with solid urea in the presence of a carrier liquid which is a solvent for urea and substantially immiscible with said hydrocarbon fraction to form a wax-urea complex, separating said complex, contacting said separated complex within a contacting zone with countercurrently flowing streams of additional carrier liquid and a normally liquid low boiling hydrocarbon solvent for wax, decomposing said complex within said contacting zone, withdrawing from one end of said contacting zone a hydrocarbon solvent phase containing wax dissolved therein and withdrawing from the other end of said contacting zone a carrier liquid phase containing urea dissolved therein.

8. A method of dewaxing a wax-containing hydrocarbon oil which comprises contacting said oil with a slurry comprising solid urea in admixture with a carrier liquid which is immiscible with said hydrocarbon oil and which is saturated with respect to urea to form a solid wax-urea complex, separating said wax-urea complex, subjecting the separated wax-urea complex within a contacting zone to direct contact with countercurrently flowing streams of additional amounts of said carrier liquid and a liquid hydrocarbon solvent for wax, decomposing said complex within said contacting zone, withdrawing from one end of said contacting zone a hydrocarbon solvent stream containing wax dissolved therein, withdrawing from the other end of said contacting zone a carrier liquid phase containing urea dissolved therein, removing a portion of the carrier liquid from said carrier liquid phase to produce a slurry of solid urea in admixture with remaining carrier liquid saturated with respect to urea and employing the resulting slurry to contact additional wax-containing hydrocarbon oil.

9. A method of dewaxing a waxy hydrocarbon oil which comprises contacting said oil with urea in the presence of a carrier liquid which is a solvent for urea and which is immiscible with said hydrocarbon oil to form a solid wax-urea complex, separating said complex, recovering a remaining liquid comprising the resulting treated hydrocarbon oil and said carrier liquid containing urea dissolved therein, washing said separated complex with a liquid hydrocarbon solvent which is a solvent for wax and for said treated hydrocarbon oil and which is immiscible with said carrier liquid so as to remove any occluded remaining liquid from said separated complex, combining the resulting wash liquid with said remaining liquid in a first contacting zone in direct contact with additional hydrocarbon solvent and additional carrier liquid, separately withdrawing from said contacting zone a hydrocarbon solvent stream containing the resulting treated hydrocarbon oil dissolved therein and first carrier liquid phase containing urea dissolved therein, forming a slurry of said washed separated complex with said first carrier liquid phase, introducing said slurry into a second contacting zone in direct contact with additional hydrocarbon solvent and additional carrier liquid, decomposing said complex within said second contacting zone and separately withdrawing from said second contacting zone a liquid hydrocarbon solvent stream containing wax dissolved therein and a second carrier liquid phase containing urea dissolved therein.

10. A method of dewaxing a wax-containing hydrocarbon oil which comprises contacting said oil with a first slurry comprising solid urea in admixture with a carrier liquid which is immiscible with said hydrocarbon oil and which is saturated with respect to urea to form a solid wax-urea complex, separating said complex, recovering a remaining liquid comprising the resulting treated hydrocarbon oil and said carrier liquid containing urea dissolved therein, introducing said remaining liqud into a first contacting zone in direct contact with additional carrier liquid and a liquid hydrocarbon solvent which is substantially immiscible with said carrier liquid and which is a solvent for wax and for the resulting treated hydrocarbon oil, separately withdrawing from said first contacting zone a hydrocarbon solvent stream containing the resulting treated hydrocarbon oil dissolved therein and a first carrier liquid phase containing urea dissolved therein, forming a second slurry comprising said separated complex and said first carrier liquid phase, decomposing the resulting slurried complex by direct contact with additional hydrocarbon solvent and additional carrier liquid within a second contacting zone and separately withdrawing from said second contacting zone a hydrocarbon solvent stream containing wax dissolved therein and a second carrier liquid phase containing urea dissolved therein.

11. A method in accordance with claim 10 wherein a portion of the carrier liquid in said second carrier liquid phase is removed therefrom to produce said first slurry.

12. A method in accordance with claim 10 wherein said carrier liquid is methanol.

13. A method in accordance with claim 10 wherein said carrier liquid is isopropyl alcohol.

14. A method in accordance with claim 10 wherein said carrier liquid is a normally polar liquid organic compound which exhibits an increasing solubility for urea with an increase in temperature and which is only partially miscible with hydrocarbons at a temperature below 200° F. but above its freezing point.

15. A method in acordance with claim 14 wherein said normally liquid polar organic compound is methyl ethyl ketone.

References Cited in the file of this patent

UNITED STATES PATENTS

| | | |
|---|---|---|
| 2,588,602 | Adams et al. | Mar. 11, 1952 |
| 2,606,140 | Arnold et al. | Aug. 5, 1952 |
| 2,606,214 | Higley et al. | Aug. 5, 1952 |
| 2,627,513 | Arey | Feb. 3, 1953 |
| 2,635,986 | Hess et al. | Apr. 21, 1953 |
| 2,637,681 | Arnold et al. | May 5, 1953 |
| 2,731,455 | Salzman | Jan. 17, 1956 |
| 2,763,637 | McKay et al. | Sept. 18, 1956 |